(12) United States Patent
Holmes

(10) Patent No.: US 8,088,030 B2
(45) Date of Patent: Jan. 3, 2012

(54) ELECTRICALLY VARIABLE TRANSMISSION WITH MODULAR CONSTRUCTION

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 533 days.

(21) Appl. No.: 12/325,655

(22) Filed: Dec. 1, 2008

(65) Prior Publication Data
US 2010/0137090 A1  Jun. 3, 2010

(51) Int. Cl.
*F16H 3/72* (2006.01)
(52) U.S. Cl. .............................. 475/5; 475/275; 475/286
(58) Field of Classification Search .............. 475/5, 286, 475/275
See application file for complete search history.

(56) References Cited

U.S. PATENT DOCUMENTS

| 7,278,942 B2 * | 10/2007 | Klemen et al. .................. 475/35 |
| 2006/0154771 A1 * | 7/2006 | Klemen et al. ..................... 475/5 |

\* cited by examiner

*Primary Examiner* — David D Le
*Assistant Examiner* — Derek D Knight
(74) *Attorney, Agent, or Firm* — Quinn Law Group, PLLC

(57) ABSTRACT

An electrically-variable transmission is provided with substantially identical motor modules to simplify assembly and realize economies of scale in purchasing and testing the motor modules. First and second motor modules are packaged within a transmission casing and are operatively connecting the input member and the output member and coaxially arranged about the axis of rotation. Each motor module includes a respective motor/generator with a rotor rotatable about the axis of rotation and defining a rotor cavity. A planetary gear set is packaged within the cavity and has a first, a second and a third member. A rotor hub supports the rotor and has first and second annular end portions at opposing ends of the rotor hub, and an annular midportion connected for common rotation with the first member of the planetary gear set. A selectively engagable rotating-type clutch is packaged within the cavity and connected with the rotor hub.

16 Claims, 3 Drawing Sheets

ELECTRICALLY VARIABLE TRANSMISSION WITH MODULAR CONSTRUCTION

TECHNICAL FIELD

The invention relates to a transmission having substantially identical motor modules each having a motor/generator, a planetary gear set, and a rotating-type clutch.

BACKGROUND OF THE INVENTION

Electrically-variable transmissions typically have an input member, an output member, and two electric motor/generators connected to different members of planetary gear sets. Including clutches allows one or more electrically-variable modes of operation, fixed speed ratio modes, and an electric-only (battery-powered) mode. Electrically-variable transmissions may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated by during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

It is challenging to package the two motor/generators, planetary gear sets, and multiple torque-transmitting mechanisms necessary to achieve the desired modes of operation, while meeting other applicable dimensional limitations and achieving relatively simple assembly requirements. Furthermore, although electrically variable transmissions are being mass-produced today, they are installed in only a very small fraction the total number of vehicles produced today, and so engineering and tooling costs are much more important as compared with those costs for other types of transmissions.

SUMMARY OF THE INVENTION

An electrically-variable transmission is provided with substantially identical motor modules to simplify assembly and realize economies of scale in purchasing and testing the motor modules. The transmission includes an input member having an axis of rotation and an output member, preferably arranged in a front wheel-drive arrangement. First and second motor modules are packaged within a transmission casing, operatively connect the input member and the output member, and are coaxially arranged about the axis of rotation. Each motor module includes a respective motor/generator with a rotor rotatable about the axis of rotation and defining a rotor cavity. A planetary gear set is packaged within the cavity and has a first, a second, and a third member. A rotor hub supports the rotor and has first and second annular end portions at opposing ends of the rotor hub, and an annular midportion connected for common rotation with the first member of the planetary gear set. A selectively engagable rotating-type clutch is packaged within the cavity and connected with the rotor hub. The motor/generator, planetary gear set, rotor hub, and rotating-type clutch of each respective motor module are arranged substantially identically with respect to one another in each motor module such that the motor modules are substantially identical.

Each motor/module may further include a respective stationary support connected to the transmission casing and a respective stationary-type clutch selectively engagable with the stationary support. The stationary support and stationary-type clutch are arranged outside of the respective rotor cavity substantially identically with respect to the motor/generator, planetary gear set, rotor hub, and rotating-type clutch of the respective motor module.

The transmission may include an interconnecting member coaxial with the axis of rotation and continuously connecting the second members of the planetary gear sets of the first and second motor modules for common rotation. In some embodiments, a first and a second rotatable hub may be provided, each coaxial with the axis of rotation. The first rotatable hub is continuously connected for common rotation with the third member of the second motor module. A third planetary gear set may be provided having a first member connected for common rotation with the interconnecting member, and a second member connected for common rotation with the output member. The second rotatable hub is continuously connected for common rotation with a third member of the third planetary gear set. The rotating-type clutch of the first motor module is selectively engagable to connect the rotor hub of the first motor module for common rotation with the first rotatable hub. The rotating-type clutch of the second motor module is selectively engagable to connect the rotor hub of the second motor module for common rotation with the second rotatable hub.

Preferably the planetary gear set is packaged axially between the first annular end portion and the annular midportion, and the rotating-type clutch is packaged between the midportion and the second annular end portion.

The motor modules are placed adjacent one another within a transmission casing. The motor modules are substantially identical in terms of the types of components, the arrangement of the components with respect to one another, and the dimensions of the components which are most important for tooling. If the motor modules are identical, just one inventory of identical motor modules may be maintained, and both the first and second motor modules can then be selected from the one inventory in assembling the transmission. Furthermore, if the modules are substantially identical, durability testing need only be carried out on one type of module, minimizing testing costs.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
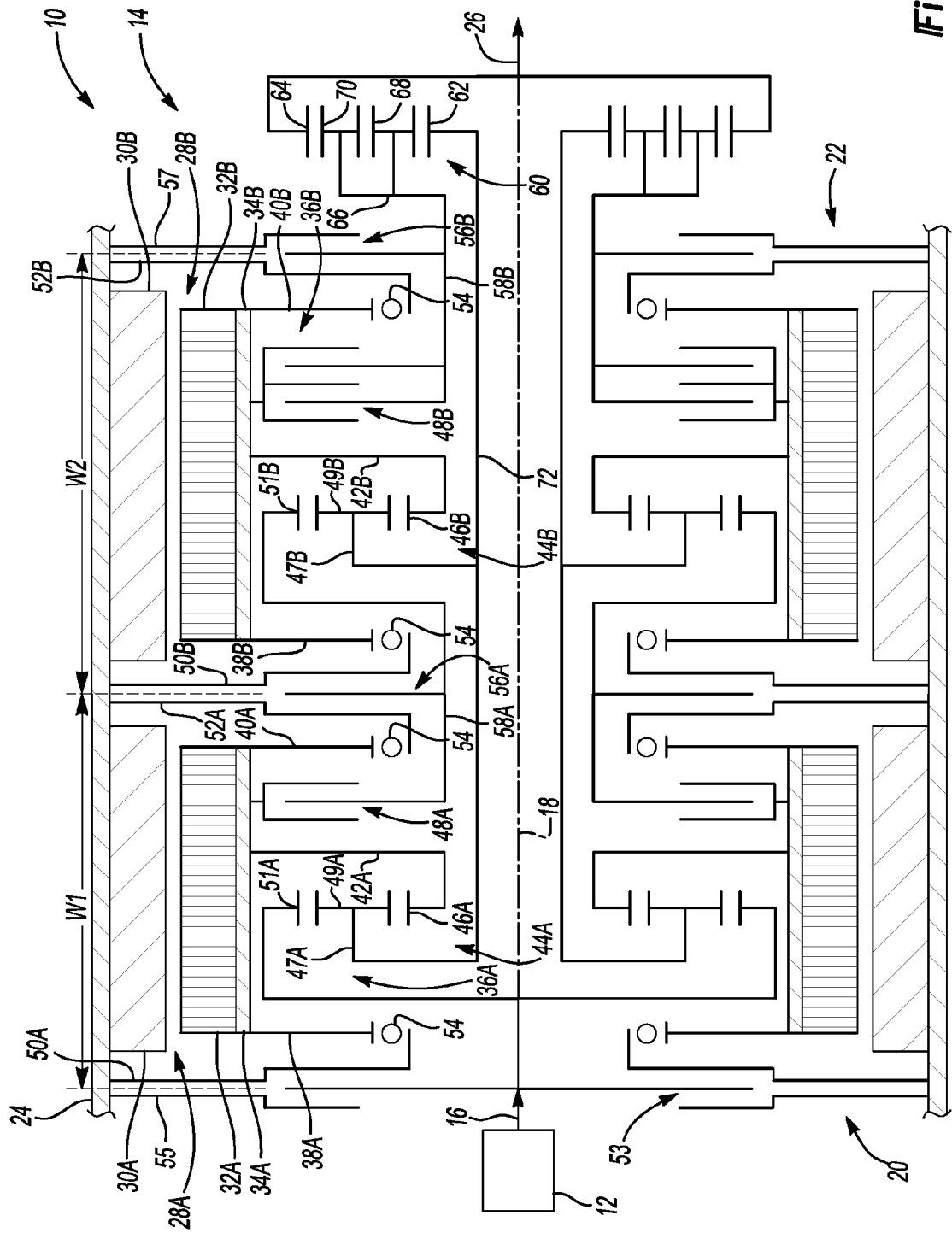
FIG. 1 is a schematic illustration in cross-sectional and stick diagram view of a first embodiment of an electrically variable transmission.

Referring to the drawings wherein like reference numbers refer to like components. FIG. 1 shows a powertrain 10 having engine 12 drivingly connected with an electrically variable transmission 14. An output member of the engine 12 is connected for driving an input member 16 of the transmission 14. The input member 16 rotates about and establishes an axis of rotation 18. A first motor module 20, and a second motor module 22 are packaged within a transmission casing 24 and are operatively connected between the input member 16 and a transmission output member 26 connected with a final drive (not shown). Those skilled in the art will recognize the transmission 14 to be arranged as a rear-wheel-drive transmission.

The first motor module 20 includes a motor generator 28A, including an annular stator 30A grounded to the transmission casing 24, an annular rotor 32A supported on a rotatable rotor hub 34A and defining a rotor cavity 36A concentric about the axis of rotation 18. The rotor hub 34A has a first annular end portion 38A and a second annular end portion 40A extending radially-inward from opposing ends of the rotor hub 34A. An annular midportion 42A extends radially-inward from the rotor hub 34A. A battery, power inverter and electronic controller (not shown) are operatively connected with the stator 30A to control the functioning of the motor/generator 28A as a motor, in which stored electrical power is provided by the battery to the stator 30A, and a generator, in which torque of the rotating rotor 32A is converted to electrical power stored in the battery. The ability to control a motor/generator to function as a motor or as a generator is well known.

Additionally, the first motor module 20 includes a planetary gear set 44A having a first member which is a sun gear 46A, a second member which is a carrier member 47A that rotatably supports a plurality of pinion gears 49A meshing with the sun gear 46A, and a third member that is a ring gear 51A meshing with the pinion gears 49A. The planetary gear set 44A is packaged within the rotor cavity 36A.

The first motor module 20 also includes a rotating-type clutch 48A that is selectively engagable to connect the rotor 32A for common rotation with a member of a planetary gear set of the second motor module 22, as described below. The rotating-type clutch 48A is packaged within the rotor cavity 36A.

The motor module 20 also includes stationary supports 50A, 52A extending from the transmission casing 24 on opposing sides of the motor generator 28A. The annular end portion 38A is rotatably supported on the stationary support 50A with a bearing 54 allowing relative rotation. The annular end portion 40A is rotatably supported on the stationary support 52A with a bearing 54 allowing relative rotation. The stationary-type clutch 56A, also included in the motor module 20, is selectively engagable to ground a first rotatable hub 58A with the transmission casing 24. The first rotatable hub 58A is also selectively connected for common rotation with the rotor 32A via engagement of clutch 48A and with the stationary support member 50B via engagement of clutch 56A. The stationary support member 52A as well as the stationary-type clutch 56A are located outside of the transmission cavity 36A. When the rotating-type clutch 48A is engaged, the first rotatable hub 58A is connected for common rotation with a member of a planetary gear set of the second motor module 22, as discussed further below.

Like the first motor module 20, the second motor module 22 includes a motor generator 28B, including an annular stator 30B grounded to the transmission casing 24, an annular rotor 32B supported on a rotatable rotor hub 34B and defining a rotor cavity 36B concentric about the axis of rotation 18. Motor generator 28B is longer along its rotational axis than motor generator 28A, but otherwise identical in mechanical dimensions and similar in construction. The rotor hub 34B has a first annular end portion 38B and a second annular end portion 40B extending radially-inward from opposing ends of the rotor hub 34B. An annular midportion 42B extends radially-inward from the rotor hub 34B. The battery, power inverter and electronic controller discussed above (not shown) are also operatively connected with the stator 30B to control the functioning of the motor/generator 28B as a motor, in which stored electrical power is provided by the battery to the stator 30B, and a generator, in which torque of the rotating rotor 32B is converted to electrical power stored in the battery.

Additionally, the second motor module 22 includes a planetary gear set 44B having a first member which is a sun gear 46B, a second member which is a carrier member 47B that rotatably supports a plurality of pinion gears 49B meshing with the sun gear 46B, and a third member that is a ring gear 51B meshing with the pinion gears 49B. The planetary gear set 44B is packaged within the rotor cavity 36B. The tooth counts and other geometrical dimensions of the gear members of the planetary gear set 44B are identical to those of the corresponding gear members of the planetary gear set 44A of the first motor module 20 described above, except that the gear face widths along the axis of the gears are slightly wider for planetary gear set 44B than for planetary gear set 44A.

The second motor module 22 also includes a rotating-type clutch 48B that is selectively engageable to connect the rotor 32B for common rotation with a member of a third planetary gear set 60, as described below. The rotating-type clutch 48B is also packaged within the rotor cavity 36B. The rotating-type clutch 48B is of a multi-plate construction but is otherwise identical to rotating-type clutch 48A.

The motor module 22 also includes stationary supports 50B, 52B extending from the transmission casing 24 on opposing sides of the motor generator 28B. The annular end portion 38B is rotatably supported on the stationary support 50B with a bearing 54 allowing relative rotation. The annular end portion 40B is rotatably supported on the stationary support 52B with a bearing 54 allowing relative rotation. The stationary-type clutch 56B, also included in the motor module 22 is selectively engagable to ground a first rotatable hub 58B with the transmission casing 24. The second rotatable hub 58B is also selectively connected for common rotation with the rotor 32B and the stationary support member 52B. The stationary support members 50B, 52B as well as the stationary-type clutch 56B are located outside of the transmission cavity 36A. When the rotating-type clutch 48B is engaged, the first rotatable hub 58B is connected for common rotation with the carrier member of a third planetary gear set 60.

The first and second stationary supports 50A, 52A and 50B, 52B of each motor module 20, 22, respectively, form outer side walls of the motor modules. The stators 30A, 30B of each may be fit within an outer radial wall (not shown) connecting the two stationary supports 50A, 52A and 50B, 52B of each module 20, 22, and fit within the casing 24. Alternately, each of the stationary supports 50A, 52A and 50B, 52B may extend (not shown) to meet the stators 30A and 30B and be fastened thereto to fully assemble the modules 20 and 22. Stationary supports 52A and 50B of motor modules 20 and 22 form a housing for stationary-type clutch 56A. The housing for stationary-type clutch 53 is formed by the stationary support 50A of motor module 20 and an additional stationary support 55, which may be part of the input cover of the transmission (not shown). The housing for stationary-type clutch 56B is formed by the stationary support 52B and an additional stationary support 57, which may be part of the output cover of the transmission (not shown). The width W1 of the second motor module 22 is slightly greater than as the width W2 of the first motor module 20.

Stationary-type clutch 53 is an input brake which is selectively engagable to connect the input member 16 to the stationary support 50A, preventing rotation of the input member 16. The input brake 53 is engaged along with rotating-type clutches 48A, 48B to establish an electric-only operating mode in which both of the motor/generators 28A, 28B are controlled to operate as motors to add torque to the output member 26.

A third planetary gear set 60 (also referred to as an output gear set) coaxial with the input member 16 includes a first member that is a sun gear 62, a second member that is a ring gear 64 and a third member that is a carrier member 66 that rotatably supports a first set of pinions 68 and a second set of pinions 70 that meshes with the first set of pinions 68, such that the third planetary gear set 60 is a double pinion-type planetary gear set. The sun gear 62 meshes with the first set of pinions 68. The ring gear 64 meshes with the second set of pinions 70. The output member 26 is connected for common rotation with the ring gear member 64. In an alternative arrangement, the engine 12 could be positioned adjacent the planetary gear set 60, with the input member 16 running through the center of the transmission 10 along centerline 18 to attach to ring gear member 51A via the hub shown, similar to the layout of FIG. 2.

Those skilled in the art of transmission design will recognize that the number of gear teeth on, or the working radii of, the gear members determine the nominal gear ratio of the planetary gear set. As used herein, a "nominal gear ratio" is either the fundamental ring-to-sun ratio of a simple planetary gear set or its working equivalent for a more complicated planetary gear set. The nominal gear ratio in the case of a simple planetary gear set, is:

$N_R/N_S$, the ratio of the number of teeth of the ring gear $N_R$ to the number of teeth of the sun gear $N_S$.

For a simple planetary gear set, this ratio is generally known simply as the "gear ratio", but a broader term must be included herein to define the relative sizes of the members of a planetary gear set to include compound planetary gear sets. In the case of a compound planetary gear set, the nominal gear ratio depends upon the ratio of the component that acts as a ring gear would in a simple planetary gear set to the component that acts as a sun gear would in a simple planetary gear set.

For example, in a compound planetary gear set having a sun gear, a carrier member rotatably supporting two sets of pinion gears and a ring gear, with a first set of the pinion gears meshing with the sun gear and with a second set of the pinion gears, and with the second set of pinion gears also intermeshing with the ring gear, the nominal gear ratio is:

$N_R/N_S-1$, the ratio of the number of teeth of the ring gear member $N_R$ to the number of teeth of the sun gear member $N_S$, less one.

By deliberately choosing the gear ratios of the planetary gear sets used in a transmission, the speed ratios attainable, and steps between ratios, may be designed as desired. In some of the transmission embodiments disclosed herein (see FIG. 1 and FIG. 2), two of the planetary gear sets have substantially identical ratios (the planetary gear sets included in the motor modules), while the third planetary gear set is designed with a nominal gear ratio close to 1.0, which causes the motor/generators to be subjected to the same maximum torque requirement during operation, allowing them to be substantially identical in size and power requirements. However, it is difficult in practice to construct a robust planetary gear set with a nominal gear ratio of exactly 1.0, even when using two sets of pinion gears, so that the maximum torque requirements for the two motor/generators may instead be slightly different. Thus, this invention provides for the motors to be either identical or different in length, which still allows the motors to share a majority of the tools to manufacture them.

An interconnecting member 72 is coaxial and concentric with input member 16. The interconnecting member 72 connects the carrier member 47A, carrier member 47B and the sun gear 62 for common rotation.

The transmission 14 is controllable to establish many different operating modes. A first forward electrically-variable mode of operation, which is an input-split mode, is established by engaging stationary-type clutches 56A and 56B, controlling motor/generator 28A to act as a generator and motor/generator 28B to act as a motor, with the engine 12 supplying power to the input member 16. A second electrically-variable mode of operation, which is a compound-split mode, is established by simultaneously disengaging stationary-type clutch 56A and engaging rotating-type clutch 48A to shift from the first electrically-variable mode to the second electrically-variable mode. Stationary-type clutch 56B remains engaged. The motor/generator 28A is controlled to operate as a motor while motor/generator 28B acts as a generator and the engine 12 continues to add torque at the input member 16. A third electrically-variable mode of operation is established by disengaging stationary-type clutch 56B and engaging rotating-type clutch 48B. Rotating-type clutch 48A remains engaged. Motor/generator 28A is controlled to operate as a generator and motor/generator 28B is controlled to operate as a motor.

The transmission 14 also has three forward fixed ratio modes. A first fixed ratio mode is established by engaging rotating-type clutch 48A and stationary-type clutches 56A and 56B, preferably at a first mechanical point established between the first and second electrically-variable modes. A second fixed ratio mode is established by engaging rotating-type clutches 48A, 48B and stationary-type clutch 56B, preferably at a second mechanical point established between the second and third electrically-variable operating modes. A third fixed ratio mode is established by engaging rotating-type clutches 48A, 48B and stationary-type clutch 56A, preferably at a third mechanical point established during the third electrically-variable operating mode. The electric-only operating mode is established by engaging the input brake 53 when the engine 12 is off, to provide a reaction member for ring gear 51A, while the motor/generators 28A, 28B are controlled to act as motors with rotating-type clutches 48A, 48B engaged.

The transmission 14 is capable of driving the output member 26 without action of the engine 12, that is, while input member 16 is stationary, in any of the electrically-variable modes but would preferably operate in the first forward electrically-variable mode. The transmission 14 is also capable of driving the output member 26 in reverse in any of the electrically-variable modes but would preferably operate in the first forward electrically-variable mode for reverse operation as well, simply by choosing a combination of speeds of the motor/generators 28A and 28B to cause reverse rotation of the output member 26.

Second Embodiment

Figure 2:
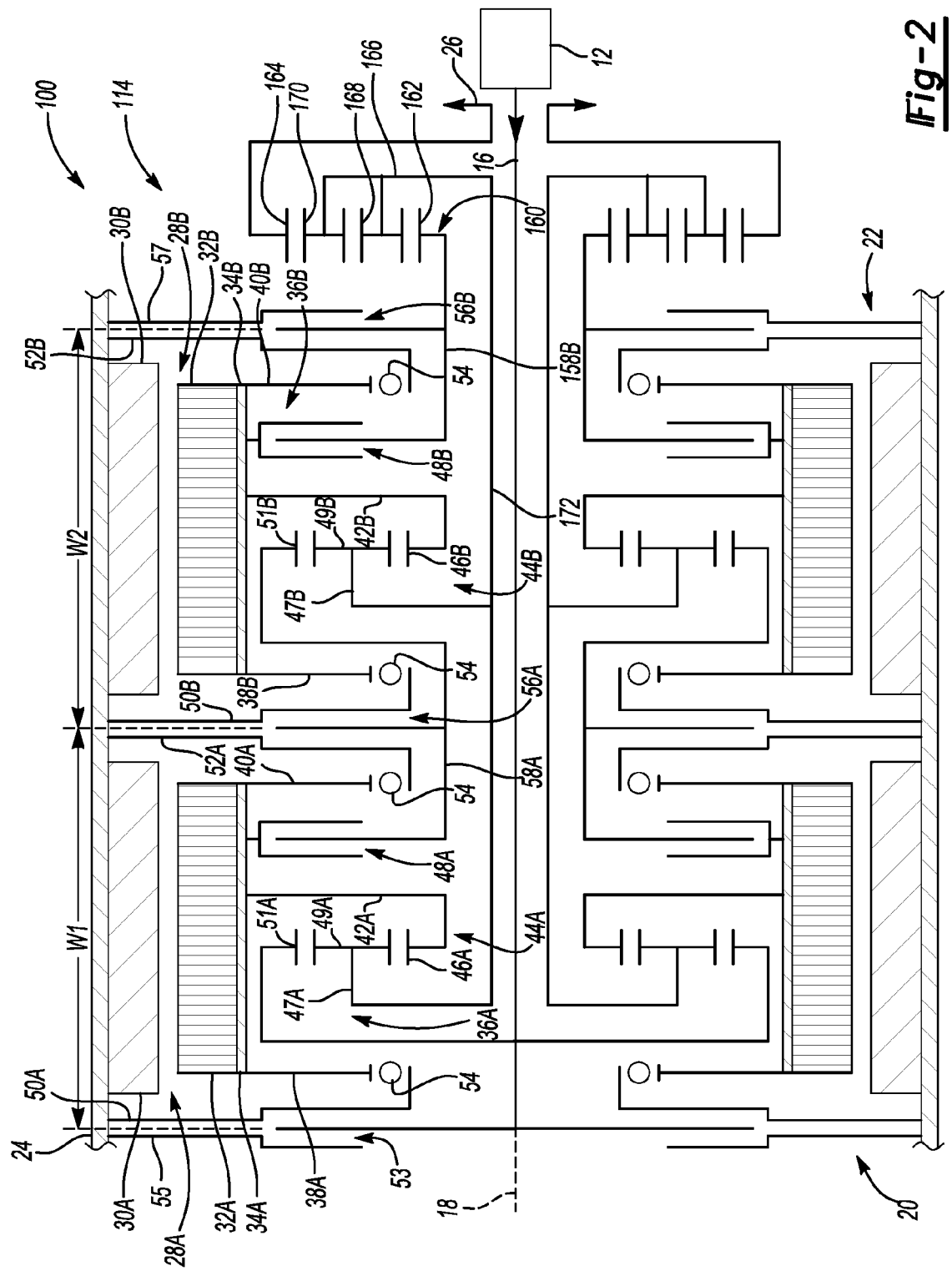
FIG. 2 is a schematic illustration in cross-sectional and stick diagram view of a second embodiment of an electrically variable transmission.

Referring to FIG. 2, another embodiment of a powertrain 100 has engine 12 operatively connected with an electrically variable transmission 114. The powertrain 100 and transmission 114 include many of the same components as the powertrain 10 and transmission 14 of FIG. 1. Such components are indicated with the same reference numbers as used in FIG. 1, and function in like manner as described above, to establish the same operating modes. However, the transmission 114 has a third planetary gear set 160 (also referred to as an output gear set) that is different from planetary gear set 60. The planetary gear set 160 is coaxial with the input member 16 and includes a first member that is a carrier member 166, a second member that is a ring gear 164 and a third member that is a sun gear 162 that rotatably supports a first set of pinions 168 and a second set of pinions 170 that meshes with the first set of pinions 168, such that the third planetary gear set 160 is a double pinion-type planetary gear set. The sun gear 162 meshes with the first set of pinions 168. The ring gear 164 meshes with the second set of pinions 170. The output member 26 is connected for common rotation with the ring gear member 164. A second rotatable hub 158B is coaxial and concentric with the input member 16 and is continuously connected for common rotation with the sun gear member 162. The second rotatable hub 158B is selectively connected for common rotation with the rotor 32B by engagement of the rotating-type clutch 48B. The second rotatable hub 158B is selectively grounded to the transmission casing 24 by engagement of the stationary-type clutch 56B. An interconnecting member 172 that is coaxial and concentric with the input member 16 is continuously connected for common rotation with the carrier member 47A, the carrier member 47B and the carrier member 166. With this arrangement, the third planetary gear set 160 has a nominal gear ratio of $N_R/N_S-1$, the ratio of the number of teeth of the ring gear member $N_R$ to the number of teeth of the sun gear member $N_S$, less one.

Third Embodiment

Figure 3:
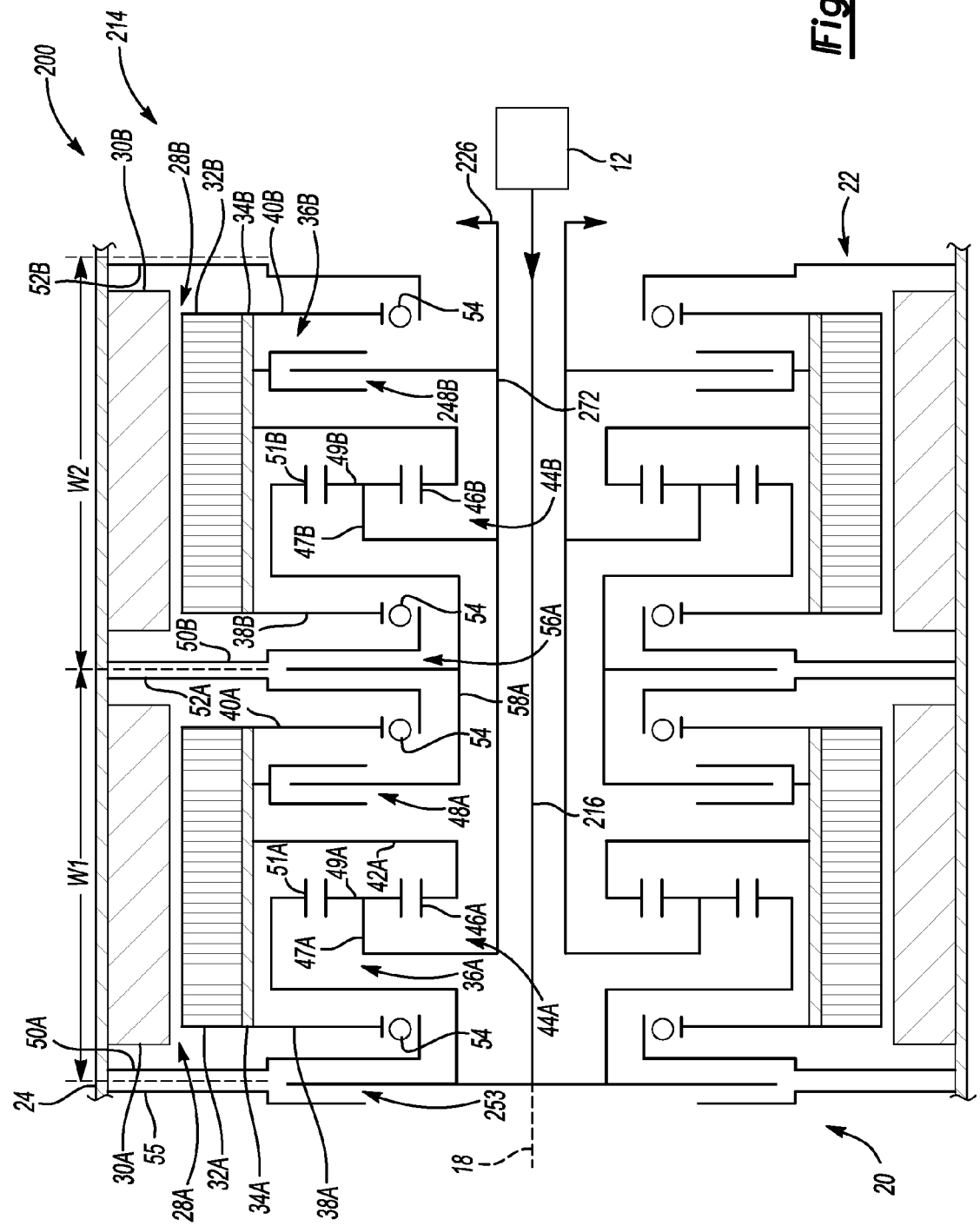
FIG. 3 is a schematic illustration in cross-sectional and stick diagram view of a third embodiment of an electrically variable transmission.

Referring to FIG. 3, a third embodiment of a powertrain 100 has engine 12 operatively connected with an electrically variable transmission 214. The powertrain 200 and transmission 214 include many of the same components as the powertrain 10 and transmission 14 of FIG. 1. Such components are indicated with the same reference numbers as used in FIG. 1, and function in like manner as described above. An input brake 253 selectively grounds the ring gear 51A to the transmission casing 24. An interconnecting member 272 that is coaxial and concentric with the input member 216 continuously connects the carrier member 47A, the carrier member 47B and the output member 226 for common rotation. A second rotating-type clutch 248B is selectively engagable to connect the rotor 32B for common rotation with the interconnecting member 272. The transmission 214 provides the following operating modes: an electric-only operating mode by stationary-type clutches 253 and 56A; an electrically-variable mode by engaging stationary-type clutch 56A only, which is an input-split mode; an electrically-variable mode by engaging rotating-type clutch 48A only, which is a compound-split mode; a fixed ratio mode by engaging clutches 56A and 48A together; and another fixed ratio mode by engaging clutches 48A and 248B together.

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission comprising:
   an input member having an axis of rotation and an output member;
   a transmission casing;
   first and second motor modules within the transmission casing operatively connecting the input member and the output member and coaxially arranged about the axis of rotation; wherein each motor module includes a respective
   motor/generator with a rotor rotatable about the axis of rotation and defining a rotor cavity;
   a planetary gear set packaged within the cavity and having a first, a second, and a third member;
   a rotor hub supporting the rotor and having first and second annular end portions extending from the rotor hub toward the axis of rotation and an annular midportion that is between the first and second annular end portions and is connected for common rotation with the first member of the planetary gear set; and
   a selectively engagable rotating-type clutch packaged within the cavity and connected with the rotor hub; and
   wherein the motor/generator, planetary gear set, rotor hub, and rotating-type clutch of each respective motor module are arranged substantially identically with respect to one another in each motor module such that the motor modules are substantially identical.

2. The electrically-variable transmission of claim 1, wherein each motor/module further includes a respective stationary support connected to the transmission casing; and
   a respective stationary-type clutch selectively engagable with the stationary support; wherein the stationary support and stationary-type clutch are arranged outside of the respective rotor cavity substantially identically with respect to the motor/generator, planetary gear set, rotor hub, and rotating-type clutch of the respective motor module.

3. The electrically-variable transmission of claim 2, wherein one of the annular end portions is supported on the stationary support in each respective motor module.

4. The electrically-variable transmission of claim 2, further comprising:
   an interconnecting member coaxial with the axis of rotation and continuously connecting the second members of the first and second motor modules for common rotation;
   a first and a second rotatable hub each coaxial with the axis of rotation; wherein the first rotatable hub is continuously connected for common rotation with the third member of the second motor module;
   a third planetary gear set having a first, a second and a third member, wherein the first member of the third planetary gear set is connected for common rotation with the interconnecting member; wherein the second member of the third planetary gear set is connected for common rotation with the output member; and wherein the second rotatable hub is continuously connected for common rotation with the third member of the third planetary gear set;
   wherein the rotating-type clutch of the first motor module is selectively engagable to connect the rotor hub of the first motor module for common rotation with the first rotatable hub; and wherein the rotating-type clutch of the second motor module is selectively engagable to connect the rotor hub of the second motor module for common rotation with the second rotatable hub.

5. The electrically-variable transmission of claim 4, wherein the stationary-type clutch of the first motor module is selectively engagable to connect the first rotatable hub for common rotation with the stationary support of the first motor module; and wherein the stationary-type clutch of the second motor module is selectively engagable to connect the second rotatable hub for common rotation with the stationary support of the second motor module.

6. The electrically variable transmission of claim 1, further comprising:
an interconnecting member coaxial with the axis of rotation and continuously connecting the second members of the first and second motor modules for common rotation.

7. The electrically variable transmission of claim 6, wherein the interconnecting member is also continuously connected for common rotation with the first member of the third planetary gear set.

8. The electrically-variable transmission of claim 6, further comprising:
a first and a second rotatable hub each coaxial with the axis of transmission;
wherein the rotating-type clutch of the first motor module is selectively engagable to connect the rotor hub of the first motor module for common rotation with the first rotatable hub; and wherein the rotating-type clutch of the second motor module is selectively engagable to connect the rotor hub of the second motor module for common rotation with the interconnecting member.

9. The electrically variable transmission of claim 6, further comprising:
an input brake selectively engagable to connect the input member to the transmission casing.

10. The electrically-variable transmission of claim 9, wherein the first member of the planetary gear set of the first motor module is a sun gear; wherein the second member of the planetary gear set of the first motor module is a carrier member rotatably supporting a first set of pinion gears that mesh with the sun gear; wherein the third member of the planetary gear set of the first motor module is a ring gear that meshes with the first set of pinion gears;
wherein the first member of the planetary gear set of the second motor module is another sun gear; wherein the second member of the planetary gear set of the second motor module is another carrier member rotatably supporting a second set of pinion gears that mesh with the another sun gear; and wherein the third member of the planetary gear set of the second motor module is another ring gear member that mesh with the second set of pinion gears.

11. The electrically variable transmission of claim 10, wherein each motor module further includes a respective stationary support connected to the transmission casing; and further comprising:
a respective stationary-type clutch selectively engagable with the respective stationary support; wherein the stationary support and stationary-type clutch are arranged outside of the respective rotor cavity substantially identically with respect to the motor/generator, planetary gear set, rotor hub, and rotating-type clutch of the respective motor module;
wherein the third member of the planetary gear set of the first motor module is continuously connected for common rotation with the input member; wherein the rotating-type clutch of the first motor module is selectively engagable to connect the third member of the second motor module to the rotor hub of the first motor module; wherein the third member of the second motor module is a ring gear;
a first and a second rotatable hub each coaxial with the axis of rotation; wherein the first rotatable hub is continuously connected for common rotation with the ring gear of the second motor module;
a third planetary gear set having a first member connected for common rotation with the interconnecting member, a second member connected for common rotation with the output member; wherein the second rotatable hub is continuously connected for common rotation with a third member of the third planetary gear set;
wherein the rotating-type clutch of the first motor module is selectively engagable to connect the rotor hub of the first motor module for common rotation with the first rotatable hub; and wherein the rotating-type clutch of the second motor module is selectively engagable to connect the rotor hub of the second motor module for common rotation with the second rotatable hub.

12. The electrically-variable transmission of claim 11, wherein the first member of the third planetary gear set is a sun gear; wherein the second member of the third planetary gear set is a ring gear; and wherein the third member of the third planetary gear set is a carrier member.

13. The electrically-variable transmission of claim 11, wherein the first member of the third planetary gear set is a carrier member; wherein the second member of the third planetary gear set is a ring gear member; and wherein the third member of the third planetary gear set is a sun gear member.

14. An electrically-variable transmission comprising:
an input member having an axis of rotation;
an output member coaxial with the axis of rotation;
a transmission casing;
first and second substantially identical motor modules within the transmission casing operatively connecting the input member and the output member and coaxially arranged about the axis of rotation; wherein each motor module includes a respective
motor/generator with a rotor rotatable about the axis of rotation and defining a rotor cavity;
a planetary gear set packaged within the cavity and having a first, a second, and a third member;
a rotor hub supporting the rotor and having first and second annular end portions at opposing ends of the rotor hub and an annular midportion connected for common rotation with the first member of the planetary gear set; and
a selectively engagable rotating-type clutch packaged within the cavity and connected with the rotor hub;
wherein the planetary gear set is packaged axially between the first annular end portion and the annular midportion; and wherein the rotating-type clutch is packaged between the midportion and the second annular end portion.

15. The electrically-variable transmission of claim 14, wherein each motor module further includes a respective stationary support connected to the transmission casing; and
a respective stationary-type clutch selectively engagable with the stationary support; wherein the stationary support and stationary-type clutch are arranged outside of the respective rotor cavity substantially identically with respect to the respective motor/generator, planetary gear set, rotor hub, and rotating-type clutch of the respective motor module.

16. An electrically-variable transmission comprising:
an input member and an output member;
a transmission casing;
first and second substantially identical motor modules packaged within the transmission casing and operatively connected with the input member and the output member; wherein each motor module has a respective motor/ generator with a rotor supported on a rotor hub that has annular end portions and an annular midportion extending radially-inward therefrom, a respective planetary gear set, a respective rotating-type clutch, a respective first and second stationary support member connected to the transmission casing, and a respective stationary-type clutch selectively grounding a member of the respective planetary gear set to the respective second stationary support member;

an input brake selectively engagable to connect the input member to the first stationary support member of the first motor module to allow both motor/generators to be operated as motors to provide torque to the output member; and wherein the motor modules are arranged axially along the transmission axis from the input brake to the output member in order of the first stationary support member of the first motor module, the first annular end portion of the first motor module, the planetary gear set of the first motor module, the annular midportion of the first motor module, the rotating-type clutch of the first motor module, the second annular end portion of the first motor module, the second annular support of the first motor module, the stationary-type clutch of the first motor module, the first stationary support member of the second motor module, the first annular end portion of the second motor module, the planetary gear set of the second motor module, the annular midportion of the second motor module, the rotating-type clutch of the second motor module, the second annular end portion of the second motor module, the second annular support of the second motor module, and the stationary-type clutch of the second motor module.

* * * * *